(12) United States Patent
Miyasato et al.

(10) Patent No.: US 8,757,338 B2
(45) Date of Patent: Jun. 24, 2014

(54) HYDRAULIC SHOCK ABSORBER

(75) Inventors: Eiko Miyasato, Tsukubamirai (JP);
Masayuki Ishikawa, Tsukubamirai (JP);
Tsuyoshi Mita, Tsukubamirai (JP);
Akira Hiroki, Tsukubamirai (JP); **Youji
Takakuwa, Tsukubamirai (JP); Kouichi
Matsuzaki, Tsukubamirai (JP); Toshio
Minakuchi, Tsukubamirai (JP); Mariko
Kessoku, Tsukubamirai (JP); Kodai
Yoshinaga**, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 138 days.

(21) Appl. No.: 13/417,436

(22) Filed: Mar. 12, 2012

(65) Prior Publication Data

US 2012/0247891 A1 Oct. 4, 2012

(30) Foreign Application Priority Data

Apr. 1, 2011 (JP) ................. 2011-082151

(51) Int. Cl.
*F16F 9/00* (2006.01)
(52) U.S. Cl.
USPC .................................... 188/322.19
(58) Field of Classification Search
USPC .......... 188/283–288, 322.19, 322.22; 267/34, 267/64.15, 226
See application file for complete search history.

(56) References Cited

U.S. PATENT DOCUMENTS 8,205,729 B2 * 6/2012 Miyasato et al. ............. 188/286
8,485,326 B2 * 7/2013 Miyasato ................. 188/322.19
2009/0001636 A1 * 1/2009 Miyasato et al. .......... 267/64.13
2009/0223762 A1 9/2009 Horikawa et al.
2010/0140031 A1 6/2010 Miyasato

FOREIGN PATENT DOCUMENTS

| JP | 62-140241 U | 9/1987 |
| JP | 2006-250309 | 9/2006 |
| JP | 2008-45716 | 2/2008 |
| JP | 2009-74596 | 4/2009 |

OTHER PUBLICATIONS

Japanese Presentation of Publications and the like issued Feb. 15, 2013, in Japan Patent Application No. 2011-82151 (with English translation).
"Glossary of Terms for Industrial Hydraulic Shock Absorber", Japan Fluid Power Association, (JFPS) 1001: Jul. 2006, (with partial English translation).

* cited by examiner

*Primary Examiner* — Christopher Schwartz
(74) *Attorney, Agent, or Firm* — Oblon, Spivak, McClelland, Maier & Neustadt, L.L.P.

(57) ABSTRACT

Provided is a shock absorber enabling stable stop by damping at a terminal of a stroke and covering demanded impact-absorbing models. The shock absorber has a piston chamber, a start part for piston movement, a decelerating part, and an end part for stopping the piston. The start part forms a curve to provide a diameter larger than a virtual tapered surface formed within a stroke range of the piston and to be outward to a central axis of the piston chamber. In the decelerating part, a variation of diameter reduction is increased with the result that the diameter becomes smaller than the tapered surface, and a curve is formed so the change in variation of diameter reduction reaches the maximum variation point and turns negative. In the end part, the variation of diameter reduction is decreased with the result that a curve which enables piston stopping by damping is formed.

7 Claims, 2 Drawing Sheets

STROKE POSITION OF PISTON

STROKE ← REBOUND PHENOMENON

HYDRAULIC SHOCK ABSORBER

BACKGROUND OF THE INVENTION

1. Field of the Invention

The present invention relates to a hydraulic shock absorber which absorbs mechanical impact caused in a process of stopping a moving object with the aid of the flow resistance of oil which flows from a piston chamber in a cylinder housing.

2. Description of the Related Art

Hydraulic shock absorbers which control damping capacity to impact or reduce the peak value of impact acceleration as much as possible are disclosed, for example, in Patent Literatures, Japanese Unexamined Utility Model Registration Application Publication No. 62-140241 and Japanese Unexamined Patent Application Publication No. 2006-250309. The shock absorber disclosed in JP62-140241U has a cylinder housing and a piston chamber formed in the cylinder housing, and the piston chamber is filled with oil and formed in a taper shape which narrows so as to form a linear or quadratically curved structure in a direction of the movement of a piston. The shock absorber disclosed in JP2006-250309A has a piston chamber with an inner surface formed in a tapered structure which linearly narrows in a direction of the movement of a piston in a taper ratio ranging from 1/50 to 1/130.

In the shock absorber disclosed in JP62-140241U, since the size of an orifice formed in a gap between the cylinder housing and the piston is decreased in conjunction with the movement of the piston, a capacity to damp impact is small at the start of the damping. In the case where a rod moves to decrease the size of the orifice, an energy absorption rate increases, and the speed of a moving object to be stopped by damping decreases. In the shock absorber disclosed in JP2006-250309A, an experiment is performed with specific experimental equipment under certain conditions, and the result of the experiment indicates that the peak of impact acceleration is small in a taper ratio ranging from 1/50 to 1/130 and that such a range is therefore effective for the damping of impact.

The orifice formed between the cylinder housing and the piston desirably contributes to the following processes: in the early stage in which a moving object to be stopped by damping collides against the tip of the rod and then the stop by damping starts, impact strength is damped while the orifice area is secured in large, thereby decreasing collision noise and dust emission; in the subsequent middle stage, the amount of energy absorption is enhanced to decelerate the object to an extent in which the moving object is prevented from rebounding in the final stage; and the object is stopped by damping in the final stage. Unfortunately, the shock absorbers disclosed in JP62-140241U and JP2006-250309A cannot satisfy this desirable requirement.

In particular, although the shock absorber disclosed in JP62-140241U, especially, a shock absorber having a quadratically curved taper structure illustrated in FIG. 1 of JP62-140241U, can damp impact strength and decrease collision noise and dust emission to some extent in the early stage in which a moving object starts to be stopped by damping, energy is insufficiently absorbed in the middle stage. Since large resistance is rapidly applied in the vicinity of the terminal of a stroke, the moving object cannot be sufficiently prevented from rebounding at a stopping place. In particular, increase in the speed at which the moving object collides against the rod causes the moving object to rebound at the stopping place. The sufficient stop by damping cannot be provided at all.

This problem is explained with reference to the result of an experiment made by the inventors. FIG. 2(A) illustrates the relationship of the inner diameter of a piston chamber and a position of a piston stroke between a case in which a piston chamber has a curved inner surface a as in a representative embodiment of the present invention and a case in which a piston chamber has a tapered inner surface b as in the shock absorber disclosed in JP 62-140241U or JP2006-250309A. FIG. 2(B) schematically illustrates the relationship of the stroke position and resistance applied to a moving object by a rod in the individual cases, the relationship being indicated by curves a' and b', respectively.

As is obvious from FIGS. 2(A) and (B), in a known hydraulic shock absorber having a piston chamber with a tapered structure, since an orifice starts to narrow even though the moving object rapidly collides against the rod in the early stage in which the moving object starts to be stopped by damping, resistance applied to the moving object by a rod, namely, energy absorption by the shock absorber, does not sufficiently contribute to the damping of impact strength in the early stage as indicated by the curve b' in FIG. 2(B) as compared with the case in which the size of an orifice is constant (for example, the case illustrated in FIG. 3 in JP62-140241U). Thus, satisfactory decrease in collision noise and dust emission is not provided. As illustrated in FIG. 2(a) in JP62-140241U and FIG. 2(B) in which the curve b' indicates large resistance that causes rebound in the vicinity of the terminal of the stroke immediately before the stop of the moving object by damping, the energy absorption in the middle stage after the early stage is obviously insufficient.

Shock absorbers are required to have capability to stop significantly various types of moving objects by damping, whereas it is difficult to produce a piston chamber which enables various types of stop by damping. The above type of stop by damping is employed in spite of insufficient control characteristics because the piston chamber is formed so as to support as various types of stop by damping as possible and so as to have high moldability.

However, a shock absorber is often demanded, which has good performance and characteristics at some degree of sacrifice of moldability. A shock absorber should be therefore provided, which has some moldability and has performance satisfying user demands as much as possible.

BRIEF SUMMARY OF THE INVENTION

It is an object of the present invention to provide a hydraulic shock absorber which enables a piston to be stably stopped by damping at the terminal of a stroke as a result of appropriately adjusting variations in diameter reduction of the inner surface of a piston chamber in the following individual stages: a stage in which a moving object collides against the tip of the rod of the piston with the result that the piston starts to move; the subsequent stage for main deceleration; and the subsequent end stage for stop by damping.

It is another object of the present invention to provide a shock absorber which has a piston chamber including a start part, a main decelerating part, and an end part, the individual parts having different stroke ranges and variations in diameter reduction within the stroke ranges so as to satisfy demand characteristics, which enables the shock absorber to have flexibility to cover a wide range of impact-absorbing models.

According to an aspect of the present invention, a hydraulic shock absorber is provided, the hydraulic shock absorber including a cylinder housing; a piston chamber formed in the cylinder housing and filled with oil; a damping piston accommodated in the piston chamber so as to be able to move in the axial direction of the piston chamber; and a rod having a base end connected to the piston, the tip of the rod being led to the outside of the cylinder housing in a sealed state, wherein in a start part in which a moving object collides against the tip of the rod with the result that the piston starts to move, the inner surface of the piston chamber is formed so as to have a curve with a diameter larger than that of a virtual tapered surface formed within the diameter difference D between the start end of a stroke range of the piston and the terminal narrower than the start end; in a main decelerating part after the start part, the variation of diameter reduction of the inner surface is gradually increased with the result that a diameter becomes smaller than that of the virtual tapered surface, and the curve is formed such that the change in the variation of diameter reduction reaches the maximum variation point and turns from positive to negative; and in an end part after the maximum variation point in the main decelerating part, the variation of diameter reduction is gradually decreased with the result that a curve is formed for the stop of the piston by damping.

In a preferred embodiment of the shock absorber of the present invention, the inner surface of the piston chamber has a curve outward to the central axial line of the piston chamber in the start part and main decelerating part and has a curve inward to the central axial line of the piston chamber in the end part. Furthermore, the maximum variation point at the end of the main decelerating part within the stroke range of the piston is located at a position at which kinetic energy is attenuated to an extent which enables the piston to be stopped by damping within a stroke range in the end part after the main decelerating part.

In the shock absorber of the present invention, appropriately, the start part ranges from the start end of the stroke of the piston to 15% of the stroke in the inner surface of the piston chamber, the main decelerating part extends from the end of the start part to 60% of the stroke, and the rest of the stroke after the main decelerating part is the end part.

The variation ($\epsilon$/D) in contraction flow at the point at which the stroke transfers from the start part to the main decelerating part is at least 6%, the variation C/D of the inner diameter of the piston chamber at the maximum variation point ranges from 40 to 70%, and the ratio $\delta$/D of the maximum difference $\delta$ in the inner diameter between the virtual tapered surface and the curve inside the piston chamber to the diameter difference D ranges from 10 to 25% in the end part.

The hydraulic shock absorber of the present invention described above enables the piston to be stably stopped by damping at the terminal of the stroke as a result of appropriately adjusting the variations in diameter reduction of the inner surface of the piston chamber in the following individual stages: the stage in which a moving object collides against the tip of the rod of the piston with the result that the piston starts to move; the subsequent stage for main deceleration; and the subsequent end stage for stop by damping. In addition, there is provided the shock absorber which has the piston chamber including the start part, the main decelerating part, and the end part, the individual parts having different stroke ranges and the variations in diameter reduction within the stroke ranges so as to satisfy demand characteristics, which enables the shock absorber to have flexibility to cover a wide range of impact-absorbing models.

DETAILED DESCRIPTION OF THE INVENTION

Figure 1:
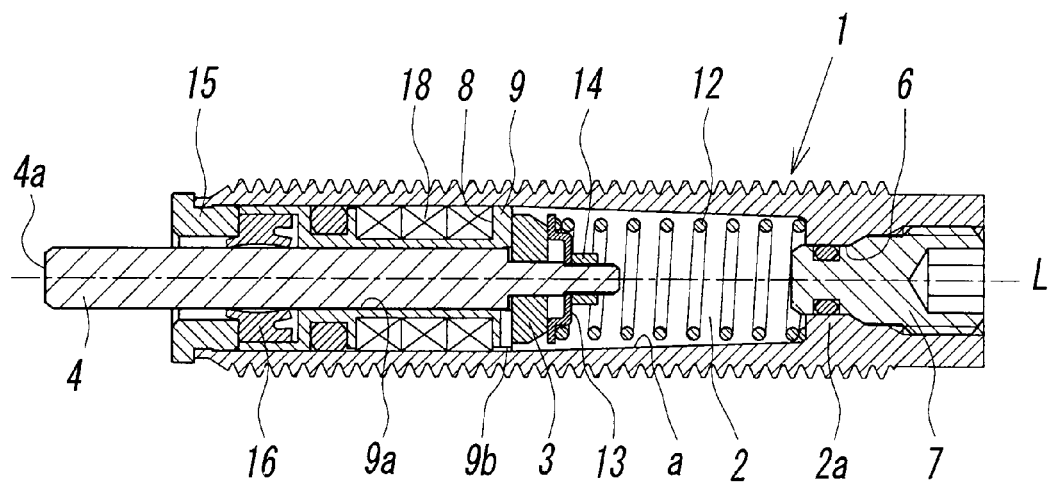
FIG. 1 is a cross-sectional view illustrating the general configuration of an embodiment of a hydraulic shock absorber of the present invention.

FIG. 1 illustrates the general configuration of an embodiment of a hydraulic shock absorber of the present invention. The shock absorber has a cylinder housing 1 with a cylindrical shape and a piston chamber 2 which is provided inside the cylinder housing 1 and filled with pressurized oil. A damping piston 3 is accommodated in the piston chamber 2 so as to be able to move in the axial direction of the piston chamber 2. The tip of a rod 4 having the base end connected to the piston 3 is led to the outside of the cylinder housing 1 in a sealed state, and the tip functions as a collision end 4a against which a moving object to be stopped by damping collides.

The configuration of the cylinder housing 1 is described further in detail. The cylinder housing has a head-side end wall 2a positioned on the side of the base end in the direction of a central axis L. An oil injection hole 6 from which oil is supplied into the piston chamber 2 is formed inside the head-side end wall 2a, and the oil injection hole 6 is sealed with a plug 7. The piston chamber 2 is provided between the head-side end wall 2a and dividing wall 9 of an accumulator chamber 8 disposed in the cylinder housing 1 on the tip side in the direction of the axis L. Although the dividing wall 9 partially functions as rod-side partition of the piston chamber 2, the dividing wall 9 of the accumulator 8 may not be used for such a partition.

Figure 2A:
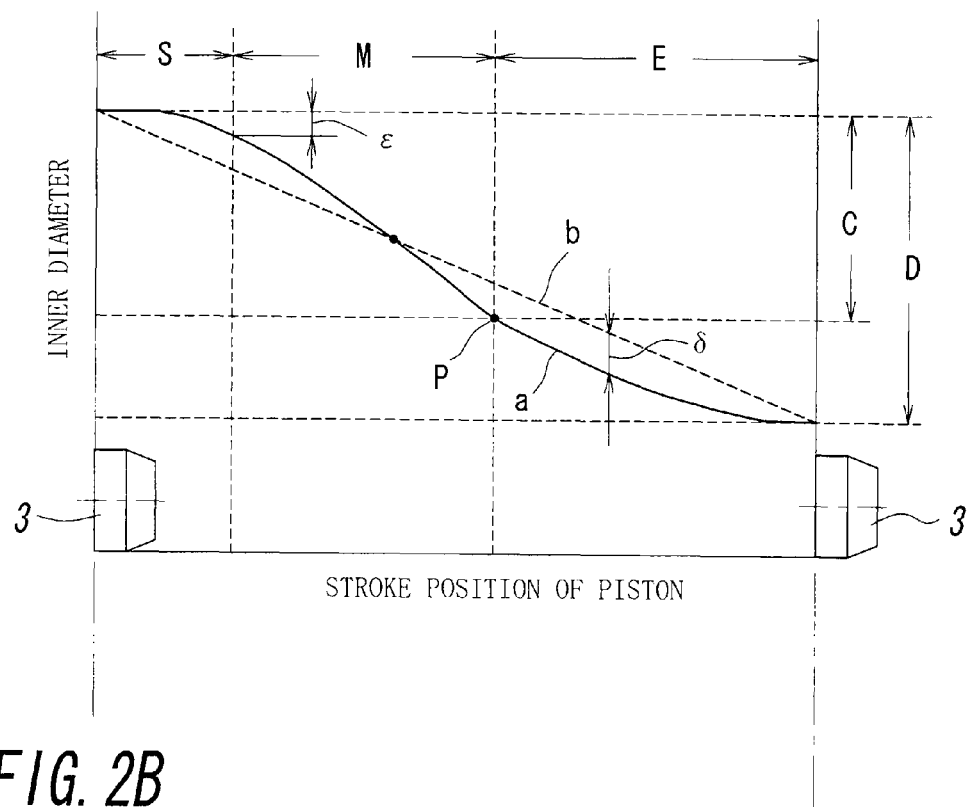
FIG. 2(A) schematically illustrates the inner shape of a piston chamber of the shock absorber of the present invention relative to a shock absorber having a known tapered surface, and FIG. 2(B) schematically illustrates relationship of stroke positions and resistance applied to moving objects by rods in the shock absorbers.

The piston chamber 2 has the inner surface in which the inner diameter gradually decreases toward the depth side so as to form a curve a [see FIG. 2(A)]. The damping piston 3 has the outer diameter smaller than the inner diameter of the piston chamber 2 and is accommodated in the piston chamber 2 so as to be able to move in the axial direction of the piston chamber 2 (the same as the direction of the axis L of the cylinder housing 1). The base end of the rod 4 is connected to the piston 3. A spring seat 13 is attached to the rod 4 by a nut 14 in addition to the piston 3. A return spring 12 is provided between the spring seat 13 and the head-side end wall 2a and continuously urges the piston 3 toward the initial position (position illustrated in FIG. 1) at which the piston 3 abuts on the partition.

The rod 4 connected to the piston 3 penetrates a central hole 9a of the dividing wall 9 of the accumulator chamber 8 and is led to the outside in a sealed state while passing the center holes of a ring-shaped rod packing 16 and an end lid 15 which closes the rod-side end of the cylinder housing 1, the rod packing 16 being provided between the dividing wall 9 and the end lid 15.

An elastic member 18 which is formed from a closed-cell cellular material so as to be able to shrink and expand is accommodated in the accumulator chamber 8 provided between the inner surface of the cylinder housing 1 and the dividing wall 9. The accumulator chamber 8 is in communication with the piston chamber 2 through continuous hole 9b formed in dividing wall 9. The accumulator chamber 8 and piston chamber 2 are filled with the pressurized oil.

In the case where a moving object to be stopped by damping collides against the tip of the rod 4 in the initial position illustrated in FIG. 1, the rod 4 presses the piston 3 with the result that the piston 3 moves to the depth side. At this time, the kinetic energy of the moving object is absorbed by the flow resistance of oil flowing through a flowing gap (orifice) formed around the piston 3, thereby stopping the object by damping.

During the movement of the piston 3 and rod 4 from the initial position to the depth side, the accumulator chamber 8 accepts the oil with the aid of the shrunk elastic member 18 in an amount corresponding to the volume of the rod 4 which has entered the piston chamber 2.

With reference to FIG. 2, the specific configuration of the curved inner surface of the piston chamber 2, in particular, the relationship of a stroke position of the piston 3 within the stroke range of the piston 3 and the flowing gap (orifice) formed around the piston 3 is described, the flowing gap being defined by the inner diameter of the piston chamber 2. Since the inner surface of the piston 2 is substantially the same as the curve a, "inner surface" may be hereinafter denoted by the symbol "a".

FIG. 2(A) illustrates the relationship of a stroke position of the piston 3 and the inner diameter of the piston chamber 2 in the representative configuration of the inner surface a of the piston chamber 2 of the present invention with the comparison with the case in which the inner surface of a piston chamber is formed in a tapered surface b as in known shock absorbers.

In particular, the stroke position of the piston 3 is broadly classified into three parts: a start part S in which a moving object collides against the tip of the rod 4 with the result that the piston 3 starts to move; a main decelerating part M after the start part S; and an end part E in which the piston 3 decelerated in the main decelerating part M is stopped. In the individual parts, the relationship of the stroke position of the piston 3 and the inner diameter of the piston chamber 2 is defined as follows.

In the start part S, the inner surface a of the piston chamber 2 has an inner diameter larger than that of a virtual tapered surface b which is formed in the piston chamber 2 so as to linearly narrow in a diameter difference D between the start end and the terminal of the stroke range of the piston 3. In addition, the inner surface a has a curve outward to the central axis L of the piston chamber 2. In the start part S, the diameter of the inner surface a of the piston chamber 2 starts to be decreased while collision noise and dust emission are decreased in the stage in which a moving object collides against the tip of the rod 4 with the result that the piston 3 starts to move. The start part S is a stroke range before the subsequent main decelerating part M, in other words, the main decelerating part M in which the energy of the piston 3 is absorbed by the diameter reduction of the inner surface a of the piston chamber 2 for intended deceleration of the piston 3 by the shock absorber.

The curve outward to the central axis L in the start part S is substantially formed so as to be expressed by easy formulae, such as quadratic equation with two unknowns, on a cross-sectional surface including the axis L, thereby easing, for example, the control in manufacturing processes. The large diameter of the inner surface a of the piston chamber 2 relative to that of the virtual tapered surface b means that it includes the case in which the diameter of the inner surface a of the piston chamber 2 is larger than the maximum diameter of the tapered surface b in the initial state and therefore includes the case in which the impact caused by the collision of a moving object against the tip of the rod 4 is steadily moderated.

The inner surface a of the piston chamber 2 in the start part S is smoothly continuous with the inner surface a in the main decelerating part M after the start part S while having a diameter larger than that of the virtual tapered surface b. The inner surface a has a curve formed as follows: the variation of diameter reduction gradually increases for the intended deceleration of the piston 3 by the shock absorber; the diameter then becomes smaller than that of the virtual tapered surface b; and the variation of diameter reduction reaches the maximum variation point P at which the change in the variation of the diameter reduction turns from positive to negative. Thus, in the main decelerating part M, the inner surface a has a curve outward to the central axis L of the piston chamber 2.

Except for a portion smoothly continuous with the adjacent curved surface, it is desirable that the curved surface in the main decelerating part M is substantially formed in a curve expressed by easy formulae, such as quadratic equation with two unknowns, on a cross-sectional surface including the axis L as in the curved surface in the start part S. On the other hand, it is important, in the main decelerating part M, to impart a structure which enables absorption rate of energy to be adjusted depending on the amount of energy of the moving object and to quickly enhance resistance for stopping the moving object by damping in the end part E as the final stage and for preventing strong collision at the terminal of a stroke and rebound in the vicinity of the terminal due to failure in absorption of kinetic energy before the terminal of the stroke. The speed of the piston 3 continues to decrease by resistance brought by the inner diameter of the piston chamber 2 determined in the main decelerating part M and is decreased to an extent which enables the piston 3 to be smoothly stopped by damping in the subsequent end part E. This helps peak value of resistance in FIG. 2(B) to decrease as much as possible.

On the basis of the above description, the maximum variation point P at the terminal of the stroke in the main decelerating part M needs to be located at least at a position which enables kinetic energy to be attenuated for stopping the piston 3 by damping (soft landing) within the stroke range in the subsequent end part E. The position of the maximum variation point P also needs to be determined in view of securing the stroke range in the end part E.

The end part E after the maximum variation point P in the main decelerating part M has a curve which is smoothly continuous with the curve in the main decelerating part M and in which the variation of diameter reduction is gradually decreased with the result that the piston 3 is stopped by damping. In the end part E, hence, the moving object which has been decelerated in the main decelerating part M is subjected to absorption of kinetic energy before the terminal of the stroke and is then controlled so as to be smoothly stopped while being prevented from strong collision against the terminal of the stroke and rebound in the vicinity of the terminal. Although the gradual decrease of the variation of diameter reduction in the end part E leads the piston chamber 2 to have the reduced diameter and the curve inward to the central axis L as described above, a clearance of $1/100$ to $5/100$ mm is provided between the piston 3 and the inside of the piston chamber 2 at the terminal of the stroke as in known shock absorbers.

In order to provide the above relationship of the stroke position of the piston 3 and the inner diameter of the piston chamber 2, desirably, the start part S is normally in the range from the start end of the stroke of the piston 3 to 15% of the stroke in the inner surface a of the piston chamber 2, the main decelerating part M extends from the end of the start part S to 60% of the stroke, and the rest of the stroke after the decelerating part M is the end part E. These ranges were confirmed through experiments in the study of the present invention and simulation by a computer.

In the experiments in the study of the present invention and the simulation by a computer, the followings were confirmed: the ratio of the variation $\epsilon$ in the diameter of the inner surface of the piston chamber at the point at which the stroke transfers from the start part S to the main decelerating part M to the diameter difference D in the inner diameter of the piston chamber between the start end and terminal of the stroke ($\epsilon/D$), in particular, an average variation of contraction flow in the start part S was appropriately 6% or smaller; and similarly, the variation of the inner diameter of the piston chamber C/D at the maximum variation point P was appropriately in the range from 40 to 70%. The reference sign C is a diameter difference in the inner diameter of the piston chamber between the start end of the stroke and the maximum variation point P.

Furthermore, the followings were confirmed: in the end part E, the ratio $\delta/D$ of the maximum difference $\delta$ in the inner diameter between the virtual tapered surface and the curved surface of the piston chamber to the diameter difference D was desirably in the range from 10 to 25%; at the ratio over 25%, the piston was likely to rebound in the vicinity of the terminal of the stroke; and at the ratio below 10%, insufficient contraction flow caused a problem in energy absorption with the result that the piston was likely to abut on the bottom at the terminal of the stroke (bottoming) or rebound in the vicinity of the terminal of the stroke.

Figure 2B:
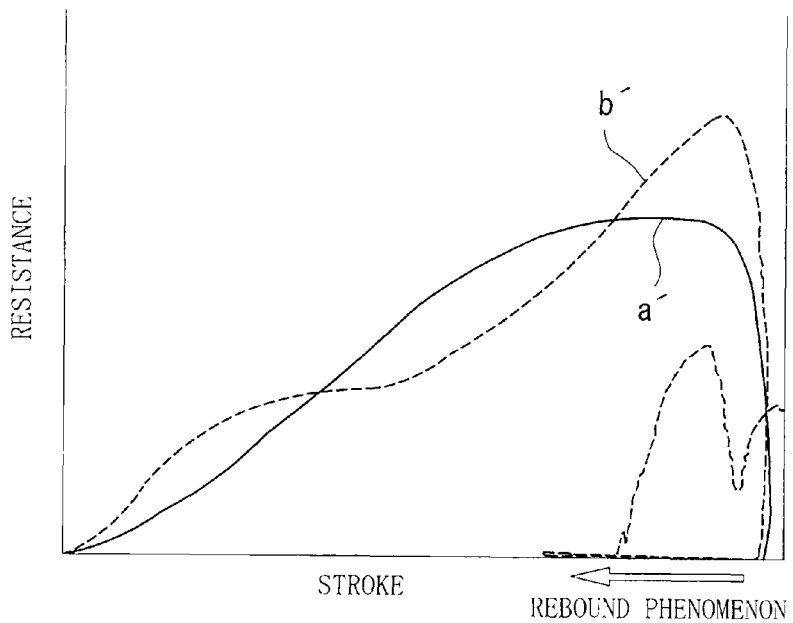

FIG. 2(B) schematically illustrates the relationship of the stroke position involving the inner surface a, which is formed in the curve described above, of the piston chamber and resistance applied to a moving object by the rod with the comparison with the case in which the piston chamber has the tapered inner surface b. In the curve a' indicating the present invention, the peak of resistance is sufficiently low, and it is obvious that inappropriate deceleration is not performed.

By virtue of the hydraulic shock absorber described above, the variation of diameter reduction of the inner surface of the piston chamber is appropriately determined in each part, and stable stop by damping can be therefore performed at the terminal of the stroke. The variation of diameter reduction in each part of the piston chamber of the shock absorber is determined so as to satisfy demand characteristics, thereby providing a shock absorber with flexibility which enables a wide range of impact-absorbing models to be covered.

The invention claimed is:

1. A hydraulic shock absorber comprising:
   a cylinder housing;
   a piston chamber formed in the cylinder housing and filled with oil;
   a damping piston accommodated in the piston chamber so as to be able to move in the direction of the axis of the piston chamber; and
   a rod having a base end connected to the piston, the tip of the rod being led to the outside of the cylinder housing in a sealed state, wherein
   in a start part in which a moving object collides against the tip of the rod with the result that the piston starts to move, the inner surface of the piston chamber is formed so as to have a concave curve with a diameter larger than that of a virtual tapered surface formed within the diameter difference between the start end of a stroke range of the piston and the terminal narrower than the start end,
   in a main decelerating part after the start part, the variation of diameter reduction of the inner surface is gradually increased with the result that a diameter becomes smaller than that of the virtual tapered surface, and the concave curve is formed such that the change in the variation of diameter reduction reaches the maximum variation point and turns from positive to negative, and
   in an end part after the maximum variation point in the main decelerating part, the variation of diameter reduction is gradually decreased with the result that a convex curve is formed for the stop of the piston by damping.

2. The hydraulic shock absorber according to claim 1, wherein the maximum variation point at the end of the main decelerating part within the stroke range of the piston is located at a position at which kinetic energy is attenuated to an extent which enables the piston to be stopped by damping within a stroke range in the end part after the main decelerating part.

3. The hydraulic shock absorber according to claim 2, wherein a variation of the inner diameter of the piston chamber at the maximum variation point ranges from 40 to 70%.

4. The hydraulic shock absorber according to claim 3, wherein the ratio $\delta/D$ of the maximum difference $\delta$ in an inner diameter between the virtual tapered surface and the curve inside the piston chamber to the diameter difference D ranges from 10 to 25% in the end part.

5. The hydraulic shock absorber according to claim 2, wherein the ratio $\delta/D$ of the maximum difference $\delta$ in an inner diameter between the virtual tapered surface and the curve inside the piston chamber to the diameter difference D ranges from 10 to 25% in the end part.

6. The hydraulic shock absorber according to claim 1, wherein the start part ranges from the start end of the stroke of the piston to 15% of the stroke in the inner surface of the piston chamber, the main decelerating part extends from the end of the start part to 60% of the stroke, and the rest of the stroke after the main decelerating part is the end part.

7. The hydraulic shock absorber according to claim 6, wherein a variation in contraction flow at the point at which the stroke transfers from the start part to the main decelerating part is at least 6%.

* * * * *